United States Patent [19]

Yamazaki et al.

[11] 4,140,206
[45] Feb. 20, 1979

[54] COLLAPSIBLE WHEEL CHOCK

[75] Inventors: Shinichiro Yamazaki, Anjo; Chikashi Tsuzuki, Okazaki, both of Japan

[73] Assignee: Aisin Seiki Kabushiki Kaisha, Kariya, Japan

[21] Appl. No.: 833,213

[22] Filed: Sep. 14, 1977

[30] Foreign Application Priority Data

Sep. 21, 1976 [JP] Japan .................... 51-126936[U]

[51] Int. Cl.² .............................................. B60T 3/00
[52] U.S. Cl. .................................................... 188/32
[58] Field of Search ............................ 188/4 R, 5, 32

[56] References Cited

U.S. PATENT DOCUMENTS

| | | | |
|---|---|---|---|
| 1,768,265 | 6/1930 | Nicholls | 188/32 |
| 2,316,178 | 4/1943 | Morgensen | 188/32 |
| 3,353,633 | 11/1967 | Leonard et al. | 188/32 |
| 3,664,466 | 5/1972 | Rotheiser | 188/32 |
| 3,845,845 | 11/1974 | Geisthoff | 188/32 |

FOREIGN PATENT DOCUMENTS 457706  3/1928  Fed. Rep. of Germany ............ 188/32

Primary Examiner—Duane A. Reger
Attorney, Agent, or Firm—Sughrue, Rothwell, Mion, Zinn and Macpeak

[57] ABSTRACT

A collapsible wheel chock constructed entirely of plastics material is comprised of a wheel engaging element and a ground engaging element detachably secured to each other for pivotal movement relative to each other. A support element is detachably secured to the opposite end of the wheel engaging element for pivotal movement relative thereto with the opposite end detachably engaged with the base member for slidable movement relative thereto to allow the wheel chock to be erected and collapsed.

6 Claims, 12 Drawing Figures

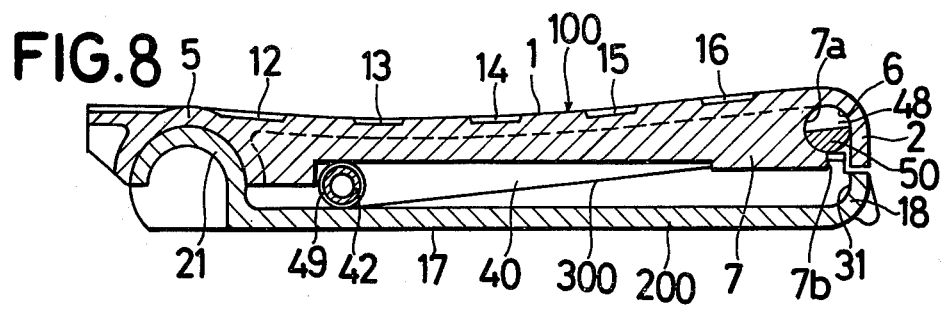
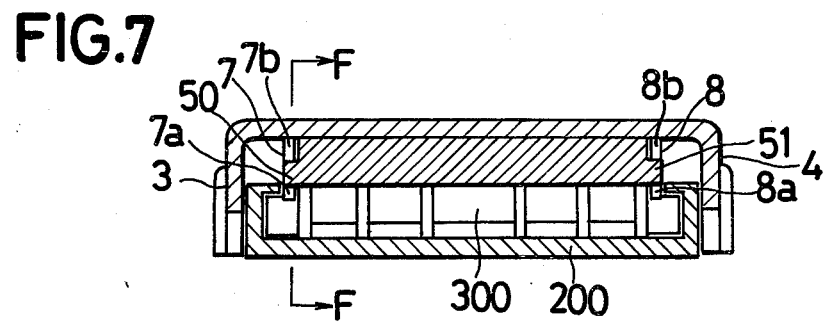
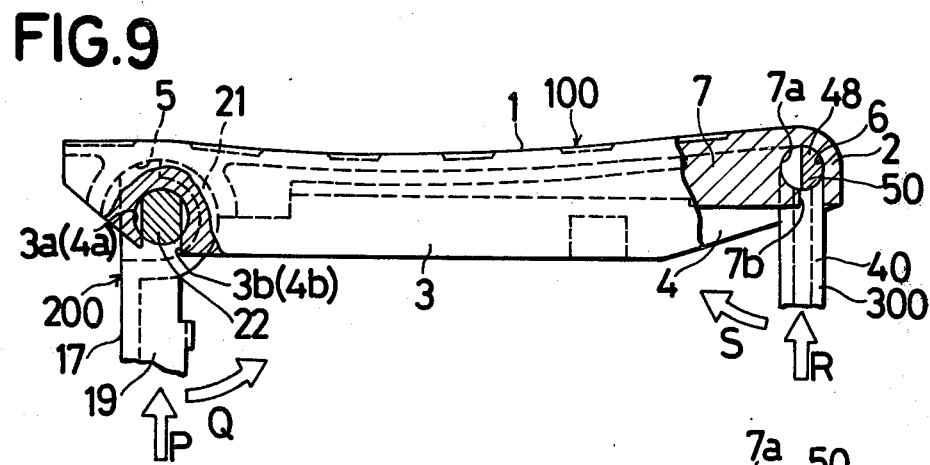
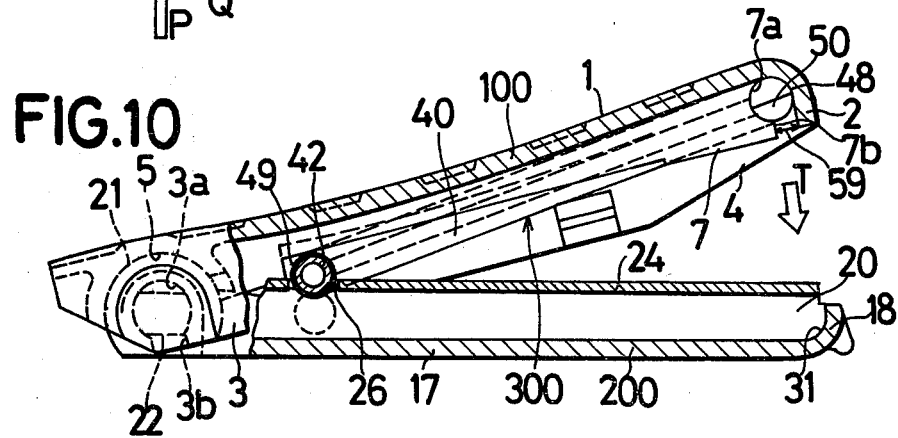

COLLAPSIBLE WHEEL CHOCK

BACKGROUND OF THE INVENTION

It is old and well known as evidenced by the patent to Little, U.S. Pat. No. 3,387,686 construct a collapsible wheel chock from heavy metal elements including a base frame and an upper frame hinged together permanently at one end thereof for movement of the upper frame from the position nested in the base frame to an upwardly inclined working position. Such a collapsible wheel chock is also provided with a support plate which will be disposed between the frames when nested and arranged to automatically assume a stand position therebetween when the upper frame is moved to the inclined working position. The support plate is also permanently pivoted to the upper frame and the upper frame and base frame are provided with an expanded metal anti-skid surface. Thus, the entire assembly is very heavy and cannot be disassembled for the replacement of a defective member.

It is also old and well known to construct a rigid, non-collapsible wheel chock from plastics material as evidenced by by Japanese Utility Model No. 5694/1967.

SUMMARY OF THE INVENTION

The present invention is directed to a collapsible wheel chock constructed completely of light-weight plastics material.

The wheel chock is comprised of three parts which are readily detachable from one another for replacement of any defective part and the three parts are collapsible into a compact nested pocket-size arrangement.

The collapsible wheel chock according to the present invention is comprised of a wheel engaging member, a base member pivotally connected by means of detachable connection at one end of the wheel engaging member and a support member pivotally connected to the wheel engaging member at the opposite end thereof by means of a detachable connection. The base member is provided with a pair of guide grooves for receiving a pair of oppositely directed lugs at the end of the support member opposite the pivotal connection of the support member to the wheel engaging member. The lugs may only be inserted into and removed from the guide grooves at a location adjacent the pivotal connection between the wheel engaging member and the base member so that the support member cannot be inadvertently disengaged from the base member when the wheel chock is in the raised operative condition with the three members forming a triangle.

The present invention provides a unique pivotal arrangement between the three members of a collapsible wheel chock whereby the load forces transmitted through the wheel engaging member and the support member to the base member are carried by pivotal connections which extend the entire width of the collapsible wheel chock. Furthermore, the angle of rotation between the wheel engaging member and the support member is limited to 90° and interfitting means at the pivotal connection between the support member and the wheel engaging member prevent disengagement of the support member from the wheel engaging member when the support member is in operative engagement with the base member. Similar interengaging means are provided at the pivotal connection between the wheel engaging member on the base member to prevent disengagement therebetween the three members of the wheel chock are assembled with each other.

The collapsible wheel chock according to the present invention is provided with suitable integrally molded reinforcing ribs on the wheel engaging member and the support member and anti-friction grooves are provided on the wheel engaging member and the base member.

The foregong and other objects, features and advantages of the invention will be apparent from the following more particular description of a preferred embodiment of the invention as illustrated in the accompanying drawings.

BRIEF DESCRIPTION OF THE DRAWINGS

FIG. 7 is a sectional view taken along the line E—E in FIG. 2;

FIG. 8 is a sectional view taken along the line F—F in FIG. 7;

FIG. 9 is a side view of the wheel engaging member showing the connection on the base member and the support member thereto;

FIG. 10 is a partial cross-sectional view showing the position of the members for the connection of the support member to the base member;

DETAILED DESCRIPTION OF THE PREFERRED EMBODIMENT

Figure 1:
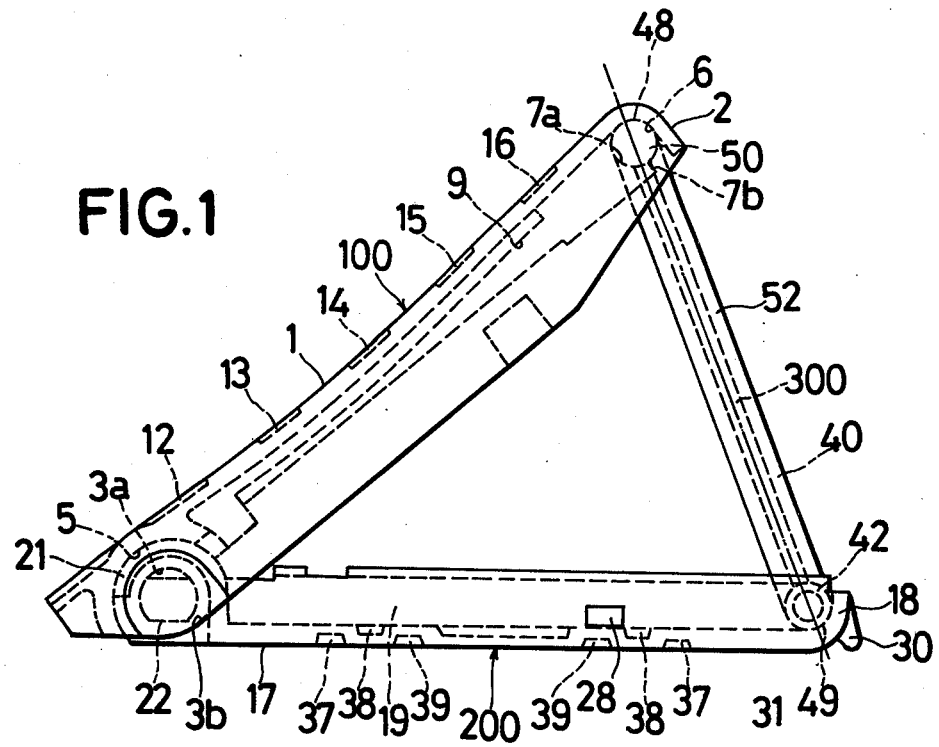
FIG. 1 is a side elevational view of the wheel chock according to the present invention in assembled operative condition.
Figure 2:
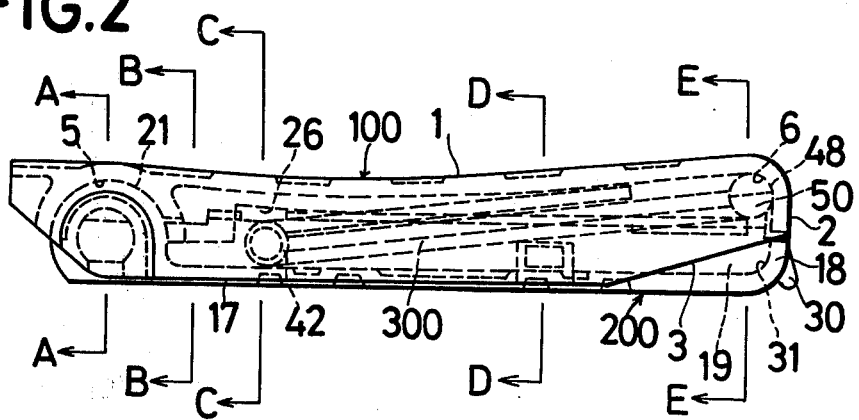
FIG. 2 is a side elevational view of the wheel chock according to the present invention in the assembled collapsed condition.
Figure 3:
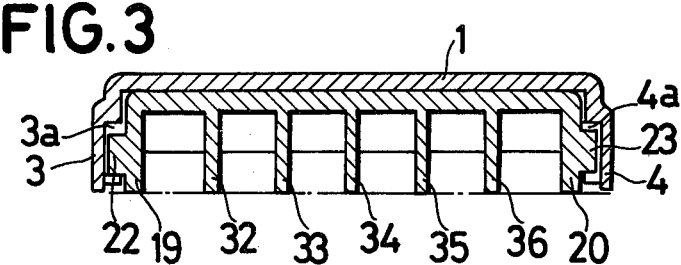
FIG. 3 is a sectional view taken along the line A—A in FIG. 2.
Figure 4:
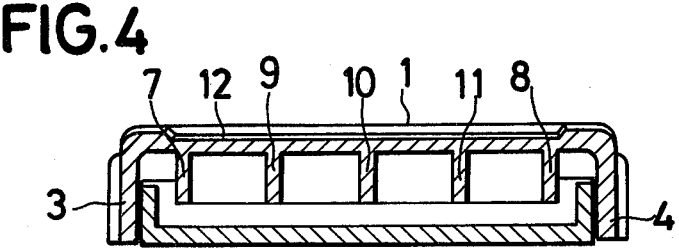
FIG. 4 is a sectional view taken along the line B—B in FIG. 2.
Figure 5:
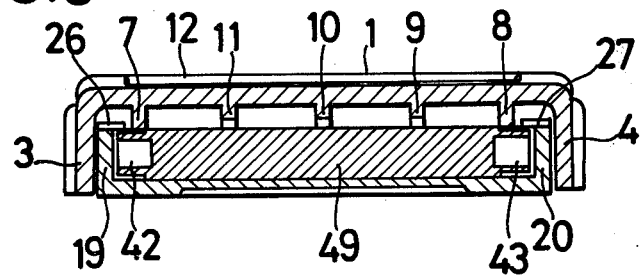
FIG. 5 is a sectional view taken along the line C—C in FIG. 2.
Figure 6:
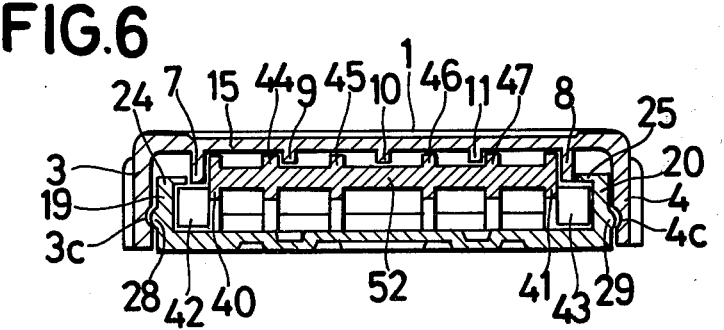
FIG. 6 is a sectional view taken along the line D—D in FIG. 2.
Figure 11:
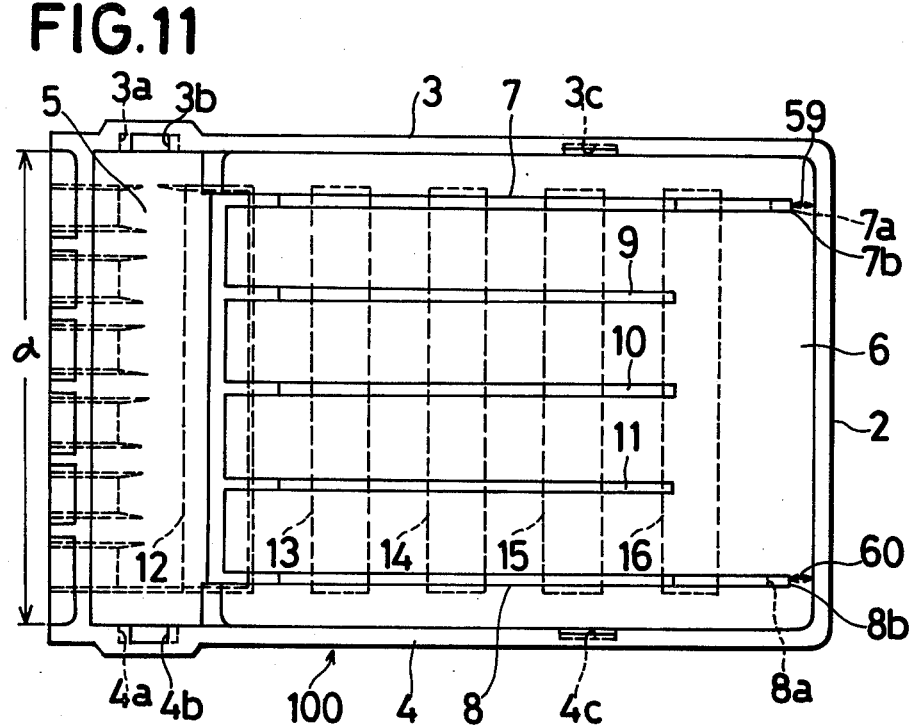
FIG. 11 is an underside view of the wheel engaging member.

The collapsible wheel chock according to the present invention is comprised of a wheel engaging member 100, a base member 200 and a support member 300 which are connected to each other to permit movement of the members from the erected position shown in FIG. 1 to the collapsed nested position shown in FIG. 2 and vice versa. The interconnection between the elements is such that it is impossible to detach the members from each other when the wheel chock is in the erected position as shown in FIG. 1. The three members may each be molded from plastics material with the wheel engaging member 200 preferably being molded from polypropylene and the support member 300 being molded from polypropylene reinforced with glass fibers.

The wheel engaging member 100 has a substantially rectilinear curved upper surface 1 adapted to engage the curved circumference of a vehicle wheel. The upper surface 1 is provided with a plurality of integrally molded grooves 12–16 which are parallel to each other and extend substantially across the entire width of the member to assist in engaging the wheel. The opposite surface of the wheel engaging member 100 has a pair of side flanges 3 and 4 and an end wall 2 depending there-from. A circular bearing portion 5 is formed at one end of the undersurface of the wheel engaging member and a pair of circular recesses 3a and 4a are formed in the side flanges 3 and 4 at each end of the recess 5 coaxial therewith. A pair vertical grooves 3b and 4b communicate the recesses 3a and 4a with the lower edge of the side flanges 3 and 4. The pair of reinforcing ribs 7 and 8 extend from the recess 5 toward the end wall 2 with the ends 7b and 8b of each rib 7 and 8 being spaced from the end wall 2. The end 7b and 8b of each rib 7 and 8 are provided with a semi-circular undercut recess 7a and 8a, respectively, which define a circular bearing surface with the curved transistion 6 between the end wall 2 and the upper surface 1 of the wheel engaging member 100. A plurality of additional reinforcing ribs 9, 10 and 11 are formed in the under surface of wheel engaging member 100 which are spaced apart and extend parallel to the ribs 7 and 8. The inside surface of each side flange 3 and 4 is provided with a recess 3c and 4c, respectively, for the reception of a locking projection on the base member which will be described hereinafter.

The base member 200 is provided with a partial cylindrical shaft portion 21 having a diameter complimentary to the recess 5 in the wheel engaging member 100. The partial cylindrical chock portion 21 is cut-away adjacent the bottom surface 17 of the base member 200 and a plurality of parallel reinforcing ribs 32–36 are disposed therein. The open spaces between the ribs will allow for the accommodation of small stones on the ground to prevent inclination of the base in the vicinity of the bearing surface. The base member 200 is provided with a pair of parallel side walls 19 and 20 and a rear wall 18 at the opposite end from the partial cylindrical bearing member 21. The width $\beta$ of the base member 200 is substantially equal to but slightly less than the distance $\alpha$ between the side flanges 3 and 4 of the wheel engaging member 100 so that the base member 200 can be received within the wheel engaging member 100 in the collapsed condition. The side walls 19 and 20 are provided with slab-sided cylindrical projections 22 and 23 which are concentric with the cylindrical bearing portion 21. The slab-sided projections 22 and 23 are capable of insertion into the vertical grooves 3b and 4b of the wheel engaging member 100 only when the base member is disposed at an angle of 90° relative to the wheel engaging member.

The side walls 19 and 20 of the base member 200 are each provided with opposed inwardly directed flanges 24 and 25, respectively, which are parallel to the bottom surface 17. Each flange 24 and 25 is provided with a recess 26 and 27, respectively, adjacent the end of the flange closest to the cylindrical bearing member 21. A pair of projections 28 and 29 are provided on the outer surfaces of the side walls 19 and 21, respectively, for engagement with the recesses 3c and 4c, respectively, formed in the inner surface of the side flanges 3 and 4 of the wheel engaging member 100. The inner surface of the base member 200 adjacent the end wall 18 is formed as a quarter cylindrical surface which will act as a bearing surface for the end of the support member 300 as will be described hereinafter. The projection 30 is provided on the outer surface of the end wall 18 to assist in grasping the base member for purposes of separating the base member and the tire engaging member from their collasped nested position with the projections 28 and 29 seated in the recesses 3c and 4c.

The support member 300 has a generally rectilinear configuration and is provided with a cylindrical bearing shaft 48 at one end for engagment with the partial cylindrical bearing surface 6 on the wheel engaging member 100. The opposite end of the support member 300 is provided with a cylindrical bearing shaft 49 which mates with the quarter cylindrical bearing surface 31 on the base member 200. Interconnecting the two cylindrical bearing portions 48 and 49 is a flat plate portion 52 having a pair of perpendicular side walls 40 and 41 and a plurality of ribs 44–47 extending parallel to the side walls and extending outwardly of the plate portion 52 on opposite sides thereof. A pair of half-cylindrical projections 50, 51 extend outwardly from the end surfaces of the cylindrical bearing shaft 48. The flat portions of the projections 50 and 51 extend parallel to the flat plate portion 52 as best seen in FIG. 9 and the radius of the projections 50 and 51 is somewhat smaller than the clearance 59 and 60 to enable the projections 50 and 51 to be inserted past the end portions 7b and 8b of the ribs 7 and 8 into the cylindrical bearing surfaces defined by the partial cylindrical bearing surface 6 and the partial cylindrical undercut portions 7a and 8a.

A pair of hollow cylindrical split projections 42 and 43 extend outwardly from the ends of the cylindrical bearing shaft 49. The diameter of the projections 42 and 43 is slightly smaller than the diameter of the cylindrical bearing shaft 49 and the projections 42 and 43 are slidably guided between the undersides of the flanges 24 and 25 on the base member 200 and the bottom surface of the base member. The projections 42 and 43 are adapted to be inserted under the flanges 24 and 25 through the gaps 26 and 27 in the flanges 24 and 25.

In order to assemble and disassemble the three members which comprise the collapsible wheel chock of the present invention and in order to manipulate the assembled members from the collapsed condition to the operative condition and vice versa only a few simple steps are required. In order to secure the members 100 and 200 together for pivotal movement relative to each other, the two members should be disposed at right angles to each other with the cylindrical bearing member 21 disposed adjacent the circular bearing surface 5 and the inner faces of the two members disposed toward each other. The slab-sided projections 22 and 23 will then be properly aligned with the grooves 3b and 4b and the projections may be forced through the grooves in the direction of the arrow P as to be disposed in the recesses 3a and 4a, respectively. After the projections are snapped into place, the members 100 and 200 will be relatively rotatably about the bearing portions 5 and 21 in the direction of the arrow Q.

In a similar manner the support member 300 is disposed at right angles to the wheel engaging member 100 with the half cylindrical shaft portions 50 and 51 in alignment with the gaps 59 and 60 at the ends of the ribs 7 and 8. The half cylindrical shafts 50 and 51 can then be forced in the direction of the arrow R through the gaps 59 and 60 into the recesses defined by the surfaces 6 and the undercut portions 7a and 8a. The side walls 40 and 41 on the support member 300 prevent the rotation of the member 300 in a counterclockwise direction relative to the member 100 as viewed in FIG. 9 but the member 300 can rotate in the direction of the arrow S toward the member 100.

In order to assemble the members 200 and 300 together, the member 300 is rotated in the direction of the arrow S as far as it will go so that the member 300 will be nested completely within the guide flanges 3 and 4 of the wheel engaging member 100. The base member 200 can then be rotated in the direction of the arrow Q which will bring the hollow cylindrical projections 42 and 43 into engagement with the notches 26 and 27 in the flanges 24 and 25 on the base member 200 as shown by the solid line position of the hollow cylindrical projection 49 in FIG. 10. Further rotation of the wheel engaging member 100 and the support member 300 toward the base member 200 in the direction of the arrow P as view in FIG. 10 will force the hollow cylindrical projections 48 and 49 through the gaps 26 and 27 into the opposed channels defined by the flanges 24 and 25. The hollow cylindrical projection 49 would then be in the dotted line position as viewed in FIG. 10 below the flange 24. In this position the three members are nested together in a compact relatively flat condition so that the collapsed wheel chock could be easily carried in a coat pocket or conveniently stored in someother location such as the glove compartment of a vehicle.

When it is desired to extend the members into operative positions as viewed in FIG. 1, it is only necessary to grasp the end wall 2 of the wheel engaging member 100 and the projection 30 on the base member 200 and pivot the two members away from each other about the cylindrical bearing members 5 and 21. When the support member is raised a sufficient distance out of the recess in the wheel engaging member 100 defined by the side flanges 3 and 4, the support member may be manually grasped and pushed the rest of the way along the opposed slots until the cylindrical shaft portion 49 disengages the quarter cylindrical surface 31 at the end wall 18 of the base member 200. Since the hollow cylindrical shaft portions 42 and 43 at each end of the cylindrical bearing shaft 49 are disposed beneath the flanges 24 and 25 on the base member 200, it is impossible to separate the support member 300 from the base member 200 in this position. Likewise since the support member 300 will be disposed at angle less than 90° relative to the wheel engaging member 100 in the position shown in FIG. 1, the half-cylindrical projections 50 and 51 will be disposed in interferring engagment wth the ribs 7 and 8 so that the support member 300 cannot be disengaged from the wheel engaging member 100 in this position. Finally, the slab sided projections 22 and 23 are not aligned with the grooves 3b and 4b in the position of FIG. 1, therefore, the wheel engaging member 100 cannot possibly be disengaged from the base member 200.

Figure 12:
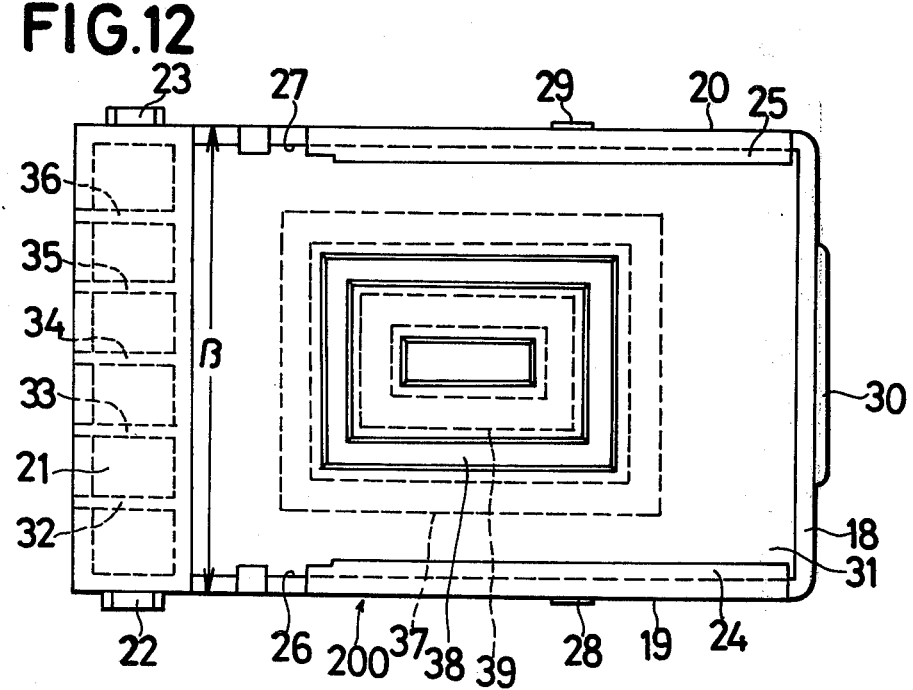
FIG. 12 is a top plan view of the base member.

A plurality of transverse grooves may be provided on the under surface of the base member 200 adjacent the end wall 18 and a pair of loop shaped grooves 37 and 39 are provided on the under surface of the base member 200 centrally thereof as seen in FIG. 12. The loop shaped groove 38 intermediate the grooves 37 and 39 is formed on the inner surface of the base member to provide a certain degree of flexibility to the bottom surface 17 of the base member 200 to accommodate an uneven surface or small stones upon which the base member may be placed.

In summary, the wheel chock according to the present invention is very lightweight compared to the prior art metal wheel chocks but is provided with a very high degree of strength due to the specific arrangement of the bearing connections between the members and the integral reinforcing ribs formed on the various members. The wheel chock is very compact in its collapsed condition to facilitate storage and can readily be assembled or disassembled to facilitate the replacement of a defective member. Although the members may be easily disassembled by reversing the above-described assembling procedures, the connecting portions between the members are such as to prevent disconnection when the wheel chock is assembled in the operative condition.

The load distribution according to the present invention is far superior to that of prior devices since the load occasioned by the engagement of a wheel with the upper surface of the wheel engaging member 100 is distributed over the entire main surface 1 and it transmitted to the base member 200 through the cylindrical bearing surfaces 5 and 21 at one end and at the other end through the cylindrical bearing surfaces 48 and 6 and the cylindrical bearing surfaces 49 and 18. Since the forces are distributed across the entire width of the collapsible wheel chock, there is no bending moment imparted along the cylindrical bearing surfaces. Although the central portion of the main surface 1 of the wheel engaging member 100 may be subjected to a bending moment, the reinforcing ribs 7–11 and the side walls 3 and 4 provide the necessary reinforcement. Likewise the support member 300 has the side walls 40, 41 and the ribs 44–47 all continuously integrally formed with the plate portion 52 so as to provide superior resistance to buckling which might be caused by a compression force. The diameter of the semi-cyclindrical projections 50 and 51 and the hollow cylindrical projections 42 and 43 are slightly less than their respective shaft portions 48 and 49 so that the projections are not subjected to the forces being transmitted from wheel engaging member 100 to the base member 200 through the support member 300.

While the invention has been particularly shown and described with reference to a preferred embodiment thereof, it will be understood by those skilled in the art that various changes in form and details may be made therein without departing from the spirit and scope of the invention.

What is claimed is:

1. A collapsible wheel chock comprising a wheel engaging member, a base member, a support member, first connecting means for detachably and pivotally connecting one end of said base member to one end of said wheel engaging member, second connecting means for detachably and pivotally connecting one end of said support member to the opposite end of said wheel engaging member and third connecting means comprising flange means extending from said one end of said base member to the other end thereof and projecting means on the other end of said support member engaging said flange means for detachably and slidably connecting said support member to said base member, said members being disposed substantially parallel to each other upon pivoting said base member and said support member toward said wheel engaging member and being disposed in a triangular arrangement when said base member and said support member are pivoted away from said wheel engaging member to the extent permitted by said third connecting means, each of said connecting means being non-detachable when said members are disposed in said triangular arrangement.

2. A collapsible wheel chock as set forth in claim 1 wherein each of said members is constructed from lightweight plastics material.

3. A collapsible wheel chock as set forth in claim 1 wherein said first connecting means is comprised of complementary cylindrical surfaces upon said wheel engaging member and said base member extending substantially across the entire width of each member, a pair of side flanges formed on said wheel engaging member with circular apertures concentric to said cylindrical surfaces, slot means in said flanges between the free edge of said flanges and said circular apertures and slab-sided cylindrical projections on said base member concentric with said cylindrical surfaces with the slab sides of said projections extending substantially parallel to the plane of said base member and being spaced apart a distance substantially equal to the width of said slots to permit entry of said projections into said circular recesses for pivotal engagement therewith.

4. A collapsible wheel chock as set forth in claim 1 wherein said second connecting means is comprised of complementary cylindrical surfaces on said wheel engaging member and said support member extending substantially across the entire width of each member, a pair of spaced apart reinforcing ribs on the under surface of said wheel engaging member, the ends of said ribs being spaced from the cylindrical surface and having an undercut semi-circular recess forming a continuation of said cylindrical surface of said wheel engaging member and oppositely extending half-cylindrical projections on said support member coaxial with said cylindrical surface thereon, said half-cylindrical projections having the flat surface thereof lying in the plane of said support member and having a radius substantially equal to the spacing between the end of said ribs and said cylindrical surface to permit insertion of said projections into the recesses defined by said cylindrical surface and said semicircular recesses for pivotal movement therein.

5. A collapsible wheel chock as set forth in claim 1 wherein said third connecting means includes an end wall on said other end of said base member, said projecting means includes a pair of projections on the other end of said support member and said flange means includes a pair of side walls on said base member, a pair of opposed flanges on said side walls extending toward each other to define a pair of opposed channels and slot means in said flanges adjacent said first connecting means; said projections being adapted to be inserted through said slot means into said opposed channels for sliding movement therealong and engagable with said end wall when said members are disposed in said triangular arrangement.

6. A collapsible wheel chock as set forth in claim 1 further comprising complementary engaging means on said base member and said wheel engaging member for releasably holding said members in the collapsed condition.

* * * * *